3,438,951
SULFUR-CURABLE POLYMERS

John F. Van de Castle, Westfield, and Herbert K. Wiese, Cranford, N.J., assignors to Esso Research and Engineering Company, a corporation of Delaware
No Drawing. Filed Dec. 31, 1963, Ser. No. 334,938
Int. Cl. C08f 15/40, 17/00, 19/00
U.S. Cl. 260—80.78                                  9 Claims

ABSTRACT OF THE DISCLOSURE

Sulfur-curable polymers of ethylene, propylene, and alkenyl substituted cyclopentent are prepared using conventional Ziegler catalysts at temperatures ranging from 20° C. to 100° C.

---

The present invention relates to new hydrocarbon polymers. More particularly, the invention is directed to sulfur-curable polymers of ethylene, at least one higher molecular weight alpha olefin, and an alkenyl substituted cyclopentene.

Numerous references in the prior art have indicated that sulfur-curable elastomers of ethylene, a $C_3$ to $C_{10}$ monoolefin, and a nonconjugated diolefin can be prepared if the diolefin used to introduce unsaturation into the polymer backbone has one double bond which is quite reactive and becomes part of the polymer backbone and the other double bond is unreactive and is used in vulcanization. Examples of materials that are used to introduce unsaturation into ethylene-alpha olefin copolymers and that have a highly reactive double bond and a relatively unreactive double bond are 1,4-hexadiene, dicyclopentadiene, and 5-methylene-2-norbornene. It has now been unexpectedly found that alkenyl substituted cyclopentenes, both double bonds of which are relatively unreactive to polymerization with Ziegler catalyst systems, can be successfully used to introduce sites of unsaturation into ethylene-$C_3$ to $C_{10}$ alpha olefin copolymers without the formation of a gel. As is well known in the art, gel formation indicates that crosslinking or polymerization at the sites of both double bonds has occurred, leaving the final polymer essentially saturated. Copolymers containing the aforementioned alkenyl substituted cyclopentenes are sulfur vulcanized at moderate conditions, as the sites of unsaturation in the polymer are believed to be the pendent alkenyl groups as the alicyclic molecule is thought to be incorporated into the terpolymer backbone. Terpolymers whose sites of unsaturation consist of shielded double bonds are often sulfur curable only under extreme vulcanization times and temperatures.

Now in accordance with this invention, rubbery, unsaturated polymers as well as saturated polymers can be prepared by polymerizing ethylene, at least one $C_3$ to $C_{10}$ alpha monoolefin, and a cyclopentent compound containing additional unsaturation in a single straight or branched chain hydrocarbon sidechain substituent. The polymerization is conveniently effected in the presence of an aromatic or a saturated aliphatic hydrocarbon diluent with conventional Ziegler catalysts. High molecular weight, elastomeric materials are obtained by conducting the polymerization reaction at moderate temperatures and pressures.

The higher molecular weight monomers employed in the polymer consists of at least one straight or branched chain aliphatic alpha monoolefin having from 3 to 10 carbon atoms, and more preferably having from 3 to 6 carbon atoms. In most polymer applications, a single higher olefin is employed; however, mixtures of higher alpha monoolefins can be employed. Representative nonlimiting examples of the useful $C_3$ to $C_{10}$ aliphatic hydrocarbon alpha monoolefins are: propylene; 1-butene; 4-methyl-1-pentene; 1-pentene; 1-hexene; 4-methyl-1-hexene; 4,4-dimethyl-1-pentene; 5-methyl-1-hexene; 1-heptene; 4-methyl-1-heptane; 5-methyl-1-heptane; 1-octene; 5,6,6-trimethyl-1-heptene; 1-nonene; and 1-decene. The preferred higher molecular weight monoolefin is propylene, because it is commercially available in large quantities at very low cost.

The diolefin utilized to impart unsaturation to the copolymer product is preferably an alkenyl substituted cyclopentene compound. The general structure of the desired cyclopentene compound may be represented by the following formula:

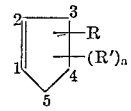

Straight or branched chain alkenyl substitution into the cyclopentene ring is designated by the value R. Alkyl substitution in the cyclopentene ring is designated by the value R', wherein $n$ is an integer of 0 to 1. The point at which the necessary straight or branched chain alkenyl substitution occurs in the ring and the optional alkyl substitution is not a critical feature of the present invention. However, the alkyl substitution should not be on the double bond of the cyclopentene ring. The alkenyl substitution should occur at either the 3, 4, or 5 position on the ring. To form the desired sulfur-curable polymers of the present invention, the value of R can be either a $C_3$ to $C_8$, preferably $C_3$ to $C_5$, straight or branched chain monoolefin having no unsaturation on the alpha carbon atom or a $C_3$ to $C_8$, preferably $C_3$ to $C_5$, branched chain monoolefin having alkyl substitution on the beta carbon atom. Essentially saturated polymers result if the unsaturation is located on the alpha carbon atom without alkyl substitution on the beta carbon atom. The value of R' represents a straight or branched chain alkyl group having from 1 to 4 carbon atoms.

Representative nonlimiting examples of cyclopentene compounds useful in the formation of unsaturated polymers include:

3(2'-methyl-1-propene)cyclopentene;
3(2'-methyl-2-propene)cyclopentene;
3(2'-ethyl-2-propene)cyclopentene;
3(2-propene)cyclopentene;
4(2-butene)cyclopentene;
3(2-butene)-4-methylcyclopentene;
3(2'-methyl-1-butene)cyclopentene;
3-butyl-4-(3'-methyl-2-butene)cyclopentene;
3-ethyl-4(4'-propyl-2-pentene)cyclopentene;
4(2'-ethyl-1-pentene)cyclopentene;
3(4-pentene)cyclopentene;
4(2'-ethyl-1-hexene)cyclopentene;
3-ethyl-4(3'-ethyl-2-hexene)cyclopentene;
4(2'-methyl-1-heptene)cyclopentene;
3(2-heptene)-4-butyl cyclopentene;

3(2-octene)cyclopentene;
3(4-octene)cyclopentene;
3-ethyl-4(6-octene)cyclopentene;
and the like.

The desired alkenyl substituted cyclopentenes can be prepared by reacting cyclopentenyl chloride with the Grignard reagent of the alkene desired to be substituted on the cyclopentene ring. The initial reaction between cyclopentenyl chloride and the alkene Grignard reagent is usually conducted at a temperature ranging from —15° C. to 0° C. for a period ranging from 0.5 to 4 hours. An alternate method of making the desired alkenyl substituted cyclopentenes involves the addition of cyclopentenyl chloride to an olefin in the presence of a Friedel-Crafts type catalyst to produce a chloroalkyl substituted cyclopentene which is subsequently dehydrohalogenated to the alkenyl substituted cyclopentene. A procedure for effecting the dehydrohalogenation involves contacting the chloroalkyl substituted cyclopentene with anhydrous sodium acetate at a temperature in the range of from about 160° to 300° C. for a period of <1 to 10 hours.

The solvents or diluents used in making the saturated and unsaturated polymers of the present invention should be liquids at the conditions of temperature and pressure used in the polymerization reaction. Solvents suitable for use in the polymerization reaction includes saturated aliphatic hydrocarbons such as pentane, hexane, isooctane, and the like; saturated cycloaliphatic hydrocarbons such as cyclopentane and cyclohexane can also be used. Halogenated hydrocarbons such as methyl chloride, tetrachloroethane, and the like; aromatic hydrocarbons such as benzene, toluene, ethylbenzene, xylene, and the like; halogenated aromatic hydrocarbons such as mono- or dichlorobenzenes, and the like, can be used as the reaction diluent in the present polymerization process.

The catalyst system employed in preparing the copolymers of this invention comprises at least two components, namely, a catalyst and a cocatalyst. The catalyst is a reducible heavy metal compound such as a halide, acetonyl acetonate, and the like, of a metal of Group IV-B through VI-B and Group VIII of the Periodic System, e.g., of titanium, zirconium, vanadium, chromium, molybdenum, and iron.

Preferably, the catalyst is selected from the group consisting of vanadium halides, vanadium oxyhalides, alkylvanadates, and alkylhalovanadates. Particularly preferred catalyst compounds are vanadium tetrachloride and vanadium oxychloride.

The cocatalyst employed in this invention comprises an organo metal of Groups I-A, II-A, and III-A of the Periodic System. Particularly valuable as second components are the lower alkyl aluminum compounds, especially trialkyl aluminum compounds such as triethyl aluminum, tripropyl aluminum, triisobutyl aluminum, and the like, and the lower dialkyl aluminum compounds such as diethyl aluminum halides, e.g., diethyl aluminum chloride, dipropyl aluminum chloride, diisobutyl aluminum chloride, and the like. The lower monoalkyl aluminum halides, e.g., ethyl aluminum dichloride, can also be used as well as mixtures of the above compounds. Particularly preferred herein are aluminum diethyl chloride and aluminum sesquichloride.

The components of the catalyst system, i.e., the catalyst and the cocatalyst, are preferably mixed with an inert organic diluent prior to their use in the polymerization reaction. Alternatively, the components of the catalyst system can be mixed or added individually to the reactants in the absence of any diluents. Generally, the molar ratio of the cocatalyst (the organo metal compound) to the catalyst is in the range of from about 1:1 to 16:1, preferably 1.5:1 to 6:1. The total amount of catalyst employed in the polymerization reaction varies with the choice of the components of the catalyst system, but is generally in the range of from about 0.0005 to about 0.02 wt. percent, preferably 0.001 to 0.01 wt. percent, based upon the total reaction mixture comprising the monomers to be polymerized and the reaction diluent.

In preparing and using catalysts according to this invention, all steps should be carried out in the absence of oxygen, moisture, carbon dioxide or other harmful impurities. This end is readily accomplished by blanketing all of the raw materials including the catalyst components, monomers, and inert diluents with an inert gas such as dry nitrogen or argon. Preferably, all materials are purified, e.g., by drying, distillation, etc., prior to their use.

The conditions at which the polymerization reaction is carried out can vary over a wide range. Generally, temperatures ranging from —40° to 150° C. can be used; however, temperatures ranging from 20° to 100° C. are preferred. Pressures ranging from 0.2 to 1000 p.s.i.g. can be employed in the polymerization reaction; however, pressures in the range of from about 1 atmosphere to 10 atmospheres are more generally used. The reaction times used in the formation of the preferred terpolymers depend in general upon the temperature used. Generally, reaction times ranging from 5 minutes to 4 hours are employed; however, it is more usual to use reaction times ranging from 5 to 25 minutes.

The reaction vessel can be constructed of any material that is inert to the reactants and diluents used, and is capable of withstanding the operating pressures. Reaction vessels made of glass, stainless steel and glass-lined steel are quite satisfactory.

The saturated and unsaturated polymers, as prepared by the process of the present invention, are characterized by an ethylene monomer unit concentration in the range of from about 20 to 75% by weight. Polymers having more ethylene monomer units tend to be stiff and non-elastomeric. The concentration of the higher $C_3$ to $C_{10}$ alpha olefin monomer ranges in general from about 15% to about 75% by weight. Polymers having a higher $C_3$ to $C_{10}$ alpha olefin content are leathery and boardy. When unsaturated polymers are prepared, the alkenyl substituted cyclopentene should be present in sufficient amounts to provide for sulfur curability, i.e., at least about 1% by weight, while the maximum amount present by weight should be such as not to interfere seriously with the elastic character of the product and the superior resistance of the polymer backbone to attack by ozone and oxygen during service. In most instances, the alkenyl substituted cyclopentene will be present in the polymer to the extent of about 3 to 15% by weight and will generally not exceed more than about 20% by weight In a typical polymerization procedure, a glass reaction vessel equipped with thermometer, stirrer, reflux condenser, gas delivery tube, and openings to permit the introduction of liquid reagents, is charged under nitrogen with an inert diluent of the type described hereinbefore that has been substantially freed of catalyst poisons. Agitation is then started and a mixture of ethylene and at least one $C_3$ to $C_{10}$ alpha olefin of the type hereinbefore described is continuously introduced through the gas inlet tubes below the liquid surface of the diluent. The nitrogen inflow may then be discontinued. The relative amounts of ethylene and $C_3$ to $C_{10}$ alpha olefin in the gas feed may be controlled by any suitable method. Generally, the ratio of ethylene to the $C_3$ to $C_{10}$ alpha olefin is in the range of about 0.1:1 to 1:1, preferably 0.3:1 to 0.6:1 on a volume basis. The monomer concentration in the diluent is not critical and generally a concentration of 2 to 20%, preferably 3 to 5%, by weight, based upon the total reaction mixture, can be employed when the polymerization reaction is conducted at substantially atmospheric pressures.

After the ethylene-alpha olefin mixture has been introduced for about 20 minutes at a rate of about 2 to 3 liters per minute, the inert diluent is substantially saturated with each monomer. The inflow of the monomers is continued and excess gas is allowed to escape through the gas outlet tube. The selected catalyst components, preferably mixed with the same inert diluent as is used in the polymerization process, are then added independently to the reaction vessel. The catalyst components can be introduced to the reaction vessel either intermittently during the course of the reaction or all at once. The selected alkenyl substituted cyclopentene can be added to the reaction vessel prior to, concurrent with, or subsequent to, the addition of the catalyst components. Generally, the molar ratio of monomer feed, i.e., ethylene:$C_3$ to $C_{10}$ alpha olefin:alkenyl substituted cyclopentene, ranges from about 1:0.8:0.004 to 1:20:0.1, preferably 1:1.5:0.01 to 1:4:0.05.

The monomers are permitted to remain in contact with the catalyst system for a period of time ranging from about 5 minutes to about 2 hours at temperatures ranging from 20° to 100° C. The concentration of terpolymer in the reaction mass reaches about 1 to 5 wt. percent during this time. As the polymerization reaction proceeds, the reaction mass becomes increasingly viscous, and it may therefore be necessary and desirable to add additional amounts of inert diluent when the terpolymer concentration rises above about 5 wt. percent.

Upon completion of the polymerization reaction, the terpolymer product is recovered from the reaction mixture by acetone precipitation or solvent evaporation. The remaining solvent is removed by heating the terpolymer on a roll rubber mill. An antioxidant, such as 2,2'-methylene-bis(6-tert. butyl-4 - methylphenol), or 4,4' - thiobis (2-tert. butyl-5-methylphenol), can be incorporated prior to the drying operation to avoid possible oxidation and degradation of the terpolymer. It should be understood that while the formation of the novel terpolymers has been described with reference to a batch process, a continuous process could be utilized as well. In this manner, the polymerization monomers, catalyst and diluent would be introduced continuously into the reaction zone and terpolymer product would be continuously or intermittently removed from the reaction zone.

The terpolymers of this invention are solid, rubbery materials having iodine numbers ranging from about 3 to 60, and more usually ranging from about 5 to 40 as determined in glacial acetic acid with iodine monochloride. The iodine number (e.g. iodine/gram of polymer) is a measure of the total unsaturation of the terpolymer. Iodine numbers in excess of about 60 are not preferred, since values higher than this are not needed for curing. The novel terpolymers exhibit viscosity average molecular weights ranging from about 80,000 to 300,000 as determined with standard correlations from viscosity measurements in decalin solution at 135° C.

The novel terpolymers of this invention are rubbery in nature and may be cured to form highly useful vulcanizates. Any one of a wide variety of curing procedures may be employed. As stated previously, the polymers may be readily cured with sulfur; in general, any of the methods familiar to those skilled in the art of processing natural rubber and butyl rubber are suitable. In addition to sulfur curing, which is preferred, one may employ a free radical cure. In carrying out a free radical cure of the copolymers, it is merely necessary to mix, by standard techniques, a free radical generator such as methyl ethyl ketone peroxide and, if desired, a free radical acceptor, such as N,N'-substituted bis-acrylamide, with the terpolymer and heat until a cure is obtained.

A wide variety of compounding agents may be incorporated with these polymers at the time they are cured in order to improve various properties. Thus, the polymers may be loaded with carbon black in order to increase the tensile strength. Other compounding agents well known to the art of processing elastomers, e.g., talc, silica, and titanium dioxide, may also be used.

The present novel polymers have many domestic and commercial applications. Such applications include conduits, such as ducts, hoses and pipes, wire and cable coatings, seals, molded mechanical goods, motor mounts, shoes, heels, tires, tire products, tank and pipe linings, and other articles of manufacture. Cements and emulsions of the polymers make outstanding adhesives for special applications.

This invention and its advantages will be better understood by reference to the following examples:

EXAMPLE 1

A 2-liter, 4-neck, glass reaction flask was fitted with a stainless steel agitator, thermometer, gas inlet and outlet tubes. The flask was flushed with dry nitrogen and 1 liter of dry normal heptane was placed in the flask under nitrogen pressure. Ethylene and propylene were metered through calibrated rotameters, passed through a 25 vol. percent solution of triisobutyl aluminum in Primol D, mixed, and introduced into the reaction flask below the liquid level of the heptane. Primol D is an industrial napthenic white oil which typically has a Saybolt viscosity of 360 seconds at 100° F. and a pour point less than 10° F. The heptane was saturated with the ethylene-propylene mixed at the rate of 3 liters per minute; the ethylene-propylene mixture consisted of 70 mole percent propylene.

After a period of 20 minutes, the normal heptane was saturated with the ethylene-propylene mixture and the internal temperature of the reaction flask was adjusted to 25° C. The polymerization catalyst, consisting of 1.360 mmols. of diethyl aluminum chloride and 0.255 mmol. of vanadium tetrachloride, was then added independently by a syringe to the saturated normal heptane. The aluminum compound and the vanadium compound had previously been prepared as 0.15 molar and 0.04 molar solutions in normal heptane, respectively. Upon completion of catalyst addition, 0.06 mole of an isomeric mixture, consisting of 60 mole percent of 3(2'-methyl-1-propene) cyclopentene and 40 mole percent of 3(2'-methyl-2-propene)cyclopentene, was then added to the reaction mixture.

The reaction mixture was then maintained at a temperature of about 24° C. for a period of 60 minutes. The ethylene-propylene mixture was permitted to bubble through the reaction mixture over the entire reaction period. Within several minutes, the homogeneous reaction mixture became very viscous and toward the end of the reaction, agitation became difficult.

The catalyst was then deactivated by the addition of 20 mls. of isopropyl alcohol. The reaction mixture was then poured into 3 liters of an acetone-methanol mixture which contained 2 liters of acetone and 1 liter of methanol. The resulting precipitated terpolymer was then washed and drum-dried, giving 12.45 grams of a soft, attractive elastomer having an iodine number of about 7.6. The inherent viscosity of the terpolymer as measured in decalin at 135° C. at a concentration of 0.5 g./liter was 1.44 indicative of a molecular weight of 80,000, and the mole percent of ethylene units as determined by infrared analysis was 70.2.

Ten grams of the above terpolymer was compounded on a rubber roll mill with 5 grams of semi-reinforcing furnace black, 0.5 gram of zinc oxide, 0.01 gram of stearic acid, 0.2 gram of sulfur, 0.1 gram of tetramethylthiuram disulfide, and 0.05 gram of benzothiazyl disulfide. The stock obtained was heated at 307° F. for 60 minutes in a mold to give cured rubbery slabs that were subsequently cut into standard dumbbells and tested at 25° C. with a Scott, Model L–5, Tensile Tester. The vulcanizate displayed the following properties: tensile strength at break, 1540 p.s.i.; modulus at 300% extension, 380 p.s.i.; elongation at break, 965%. While the above example has been described with reference to the use of a mixture of alkenyl substituted cyclopentenes, either 3(2'-methyl-1-propene) cyclopentene or 3(2'-methyl-2-propene)cyclopentene can be used alone to obtain the desired sulfur-curable copolymers.

EXAMPLE 2

The procedure of Example 1 was repeated except a higher catalyst concentration was employed. A catalyst mixture consisting of 1.800 mmols. of diethyl aluminum chloride and 0.359 mmol. of vanadium tetrachloride was used rather than the catalyst amounts called for in Example 1. The polymer obtained employing the increased catalyst concentration weighed 18.4 grams and exhibited an iodine number of about 7.7. The inherent viscosity of the polymer as measured in decalin at 135° C. at a concentration of 0.5 g./liter was 1.53 indicative of a molecular weight of 85,000 and the mole percent of ethylene units as determined by infrared analysis was 68.5. The terpolymer was cured and tested by the same procedure described in Example 1 above. At 25° C., the vulcanizate displayed a tensile strength at break of 1315 p.s.i.; a modulus at 300% extension of 370 p.s.i.; and an elongation at break of 950%.

EXAMPLE 3

The procedure of Example 1 was repeated employing 3(1-propene)cyclopentene as the third monomer in the terpolymerization reaction. A catalyst mixture consisting of 0.756 mmol. of diethyl aluminum chloride and 0.189 mmol. of vanadium tetrachloride was employed rather than the amounts called for in Example 1. Additionally, 0.040 mole of 3(1-propene)cyclopentene was added to the reaction zone rather than the amounts of the alkenyl substituted cyclopentene called for. Upon addition of the third monomer, the reaction proceeded in the usual manner and a yield at 12 grams of terpolymer was obtained. The inherent viscosity of the terpolymer as measured in decalin at 135° C. at a concentration of 0.5 g./liter was 2.48 indicative of a molecular weight of 135,000 and the mole percent of ethylene units as determined by infrared analysis was 72.1%. The wt. percent unsaturation of the terpolymer was 0.91 as determined from an iodine number of 2.13. The terpolymer product was subjected to the usual curing procedure; however, no cure was obtained. This fact is significant in that it illustrates that when an alkenyl substituted cyclopentene compound is used as the third monomer and the alkenyl group contains a double bond on the alpha carbon atom, the beta carbon atom must then contain additional alkyl substitution in order to prevent the complete polymerization of both double bonds in the compound, thus removing the desired sites of unsaturation necessary for the subsequent curing of the terpolymer. It should be noted that in tests wherein compounds having terminal substitution on the alpha carbon atom and also having alkyl substitution on the beta carbon atom were used, the resultant terpolymer contained sufficient sites of unsaturation necessary for sulfur curing.

EXAMPLE 4

Ethylene, propylene and (3(2'-ethyl-2-propene)cyclopentene are polymerized with diethyl aluminum chloride and vanadium tetrachloride to obtain a polymer product having a viscosity average molecular weight ranging from about 80,000 to 300,000 and an iodine number of from about 3 to 60. The polymer product is sulfur-curable to form high quality vulcanized elastomers.

EXAMPLE 5

Ethylene, propylene and 3(2-propene)cyclopentene are polymerized with diethyl aluminum chloride and vanadium tetrachloride to obtain a polymer product having a viscosity average molecular weight ranging from about 80,000 to 300,000 and an iodine number of from about 3 to 60. The polymer product is sulfur-curable to form high quality vulcanized elastomers.

EXAMPLE 6

Ethylene, propylene and 3(2-butene)-4-methyl cyclopentene are polymerized with diethyl aluminum chloride and vanadium tetrachloride to obtain a polymer product having a viscosity average molecular weight ranging from about 80,000 to 300,000 and an iodine number of from about 3 to 60. The polymer product is sulfur-curable to form high quality vulcanized elastomers.

EXAMPLE 7

Ethylene, propylene, and 4(2'-ethyl-1-pentene)cyclopentene are polymerized with diethyl aluminum chloride and vanadium tetrachloride to obtain a polymer product having a viscosity average molecular weight ranging from about 80,000 to 300,000 and an iodine number of from about 3 to 60. The polymer product is sulfur-curable to form high quality vulcanized elastomers.

EXAMPLE 8

Ethylene, propylene and 3(4-octene)cyclopentene are polymerized with diethyl aluminum chloride and vanadium tetrachloride to obtain a polymer product having a viscosity average molecular weight ranging from about 80,000 to 300,000 and an iodine number of from about 3 to 60. The polymer product is sulfur-curable to form high quality vulcanized elastomers.

The advantages of this invention will be apparent to those skilled in the art. Novel rubbery, curable terpolymers are made available for use in the preparation of a wide variety of products. It is to be understood that this invention is not limited to the specific examples set forth herein, which have been offered merely as illustrations, and that modifications may be made without departing from the spirit and scope of the appended claims.

What is claimed is:

1. A substantially amorphous polymer having a viscosity average molecular weight ranging from about 80,000 to 300,000 comprising at least about 20% ethylene by weight at least about 25% by weight of at least one higher aliphatic alpha olefin having from 3 to 10 carbon atoms, and at least about 1% by weight of at least one alkenyl substituted cyclopentene compound, said alkenyl substitution being selected from the group consisting of $C_3$ to $C_8$ alkenyl radicals having no unsaturation on the alpha carbon atom and $C_3$ to $C_8$ branched-chain alkenyl radicals having alkyl substitution on the beta carbon atom.

2. The polymer of claim 1 sulfur-cured to an elastomeric vulcanizate.

3. A substantially amorphous polymer having a viscosity average molecular weight ranging from about 80,000 to 300,000 that is sulfur-curable to an elastomeric vulcanizate, said polymer consisting of at least about 20% ethylene by weight, at least about 25% by weight of at least one $C_3$ to $C_6$ aliphatic alpha olefin, and at least about 1% by weight of said polymer and not over about 20% by weight of said polymer of at least one alkenyl substituted cyclopentene, said alkenyl substitution being selected from the group consisting of $C_3$ to $C_8$ alkenyl radicals having no unsaturation on the alpha carbon atom and $C_3$ to $C_8$ branched-chain alkenyl radicals having alkyl substitution on the beta carbon atom, said polymer having an iodine number ranging from about 3 to 60.

4. The polymer of claim 3, wherein said alkenyl substituted cyclopentene is a mixture of 3(2'-methyl-1-propene) cyclopentene and 3(2'-methyl-2-propene)cyclopentene.

5. The polymer of claim 3, wherein said alkenyl substituted cyclopentene is 3(2'-methyl-1-methyl-1-propene) cyclopentene.

6. The polymer of claim 3, wherein said alkenyl substituted cyclopentene is 3(2'-methyl-2-propene)cyclopentene.

7. The polymer of claim 3, wherein the $C_3$ to $C_6$ aliphatic alpha olefin is propylene.

8. The polymer of claim 3 sulfur-cured to an elastomeric vulcanizate.

9. A substantially amorphous polymer having a viscosity average molecular weight ranging from about 80,000 to 300,000 that is sulfur-curable to an elastomeric vulcanizate, said polymer consisting of at least about 20% ethylene by weight, at least about 25% propylene by weight, and at least about 1% by weight of said polymer and not over about 20% by weight of said polymer of a mixture of 3(2'-methyl-1-propene)cyclopentene and 3(2'-methyl-2-propene) cyclopentene, said polymer having an iodine number between about 3 and 60.

References Cited

UNITED STATES PATENTS

| | | | |
|---|---|---|---|
| 2,933,480 | 4/1960 | Gresham et al. | 260—80.5 |
| 2,962,488 | 11/1960 | Horne | 260—80.5 |
| 3,058,963 | 10/1962 | Vandenberg | 260—88.2 |
| 3,281,398 | 10/1966 | Natta et al. | 260—80.78 |

JOSEPH L. SCHOFER, *Primary Examiner.*

J. C. HAIGHT, *Assistant Examiner.*

U.S. Cl. X.R.

260—80.6